United States Patent [19]
Yogev et al.

[11] Patent Number: 5,862,799
[45] Date of Patent: Jan. 26, 1999

[54] CONTROL OF A HELIOSTAT FIELD IN A SOLAR ENERGY PLANT

[75] Inventors: Amnon Yogev, Rehovot; Vladimir Krupkin, Rishon, both of Israel

[73] Assignee: Yeda Research And Development Company Ltd., Rehovot, Israel

[21] Appl. No.: 981,238

[22] PCT Filed: Jun. 17, 1996

[86] PCT No.: PCT/IL96/00018

§ 371 Date: Dec. 19, 1997

§ 102(e) Date: Dec. 19, 1997

[87] PCT Pub. No.: WO97/01030

PCT Pub. Date: Jan. 9, 1997

[30] Foreign Application Priority Data

Jun. 22, 1995 [IL] Israel ................................. 1142561

[51] Int. Cl.$^6$ ................................. F24J 2/38
[52] U.S. Cl. ................. 126/578; 126/600; 250/203.4
[58] Field of Search ................................. 126/573, 578, 126/600, 601, 605, 680, 688, 698, 699; 250/203.4, 203.2, 203.3

[56] References Cited

U.S. PATENT DOCUMENTS

| | | | |
|---|---|---|---|
| 4,041,307 | 8/1977 | Napoli | 250/203.4 |
| 4,424,801 | 1/1984 | Mori | 126/578 |
| 4,445,030 | 4/1984 | Carlton | 250/203.4 |
| 4,484,565 | 11/1984 | Mori | 126/578 |
| 4,519,382 | 5/1985 | Gerwin | 126/578 |

Primary Examiner—James C. Yeung
Attorney, Agent, or Firm—Gary M. Nath; Harold L. Novick; Nath & Associates

[57] ABSTRACT

Control of a heliostat field (1) in a solar energy plant is provided with a system (6) which controls the alignment of heliostat mirrors (2) in a controlled area of the heliostat field (1) with respect to a selected zone in a target plane (P). The control system (6) comprises a detection device (7) removed from the target plane (P) in the direction of propagation of radiation (R') directed by the heliostat mirrors towards the target plane (P). The detection device (7) has a detection surface (8) facing the radiation (R'). The control system further comprises first means (9) capable of projecting on the detection surface (8) concentrated solar radiation delivered to the selected zone from the controlled area of the heliostat field (1) to produce thereon an image of the controlled area, second means (12) associated with the detection device for measuring separately the light intensity of portions of the image and third means for adjusting each heliostat mirror (2) in the controlled area in response to such measurements.

27 Claims, 4 Drawing Sheets

CONTROL OF A HELIOSTAT FIELD IN A SOLAR ENERGY PLANT

FIELD OF THE INVENTION

The invention relates to the control of a heliostat field for use in a solar energy plant that serves for conversion of a concentrated solar radiation into utilizable energy.

BACKGROUND OF THE INVENTION

In the following description and claims, the term "target plane" of a heliostat field means a plane in which the heliostat field forms an image of the sun, which is either the focal plane of the heliostat field or a plane conjugate therewith such as, for example, the focal plane of an optical system including the heliostat field and one or more additional reflectors which redirect the solar radiation concentrated by the heliostat field in direction of a solar receiver. In most cases, the target plane coincides with the radiation inlet of a solar receiver chamber. The term "alignment" used in relation to the heliostat field signifies the orientation of heliostat mirrors and/or individual facets thereof, if any, so as to focus reflected and concentrated light into the target plane and, in particular, onto the radiation inlet of the solar receiver chamber.

A conventional solar energy plant of the kind specified, such as disclosed, for example, by F. Ramos et al. in "Optimization of a Central Receiver Solar Electric Power Plant by the Aspoc Program", Proc. 4-th. intern symp. on research, development and applications of solar thermal technology, New-York, pp. 61–70, 1990, comprises a solar energy receiver placed within a chamber and a heliostat field in the form of a large Fresnel reflector having a target plane and consisting of a plurality of concentrating heliostat mirrors of a generally concave shape. Each heliostat mirror reflects the incoming solar radiation towards the target plane and there is thus formed thereby in the target plane a plurality of light spots, which together constitute a zone of concentrated solar radiation delivered by the heliostat field to the inlet of the receiver chamber. Each heliostat mirror is either a single body or is made of segments or facets having a specific mutual orientation which may be different for different heliostats of the field. During operation the angular position of each heliostat mirror at a given time is controlled by computer means whose program adjusts automatically to the position of the sun.

The efficiency of the solar energy plant, i.e. the conversion rate of solar energy into utilizable heat or electric power, depends on the amount of solar radiation collected by the heliostat field as well as on the solar energy concentration achieved at the inlet of the solar energy receiver chamber. The amount and concentration of radiation delivered to said inlet depend to a large extent on the accuracy of alignment of the heliostat field with the inlet of the solar receiver chamber. In other words, the higher the alignment accuracy of the heliostat mirrors and of the adjustment of their facets, the better the overlap of the individual light spots produced by different heliostat mirrors and by different facets thereof in the target plane and, consequently, the higher the amount and concentration of light delivered at the inlet of the solar receiver.

It is, therefore, clear that during operation of a solar plant of the kind specified, the orientation of the heliostat mirrors and the disposition of their facets have to be continuously controlled and adjusted in response to changing conditions, in order to maximize the amount and light delivered to the receiver chamber inlet.

It has been suggested to control the orientation of each heliostat mirror on the basis of detection of the direction of light reflected by the mirror, by means of a detector attached thereto. However, such a control system requires a high number of detectors each of which has to be properly aligned with respect to both the target plane and mirror. Furthermore, such a system cannot provide for correction of errors caused by misalignments of the facets, or dislocation of the target plane or of any of the detectors.

Conventionally, the initial alignment of the heliostat field and of individual heliostat mirrors thereof is based on measurements of the intensity of the light spots in the target plane. However, this procedure is inefficient because the overlapping light spots simultaneously produced by the heliostat mirrors and which together constitute a zone of concentrated solar radiation, cannot be identified individually and consequently the heliostat mirrors have to be aligned manually one after the other by qualified personnel. Obviously this procedure is very slow and has the further drawback that during the alignment procedure each of the manually handled heliostat mirrors is excluded from radiation delivery for the duration of the alignment procedure, whereby the amount of collected light is reduced. Moreover, where the heliostat mirrors are composed of facets, the intensity of the individual small light spots produced by each facet of a heliostat mirror that has to be aligned is only a fraction of the total intensity of the full spot produced by that mirror and can be discerned on the background thereof only with great difficulty, which complicates the adjustment of the individual facets of each mirror and gives rise to inaccuracies.

BRIEF DESCRIPTION OF THE INVENTION

It is the object of the present invention to provide a solar energy plant of the kind specified comprising an improved heliostat field with means for control thereof.

It is another object of the present invention to provide an improved heliostat field and means for control thereof.

In accordance with one aspect of the present invention there is provided a solar energy plant comprising a heliostat field having a plurality of heliostat mirrors for the concentration of solar radiation and direction of the concentrated solar radiation towards a target plane, characterized in that the heliostat field is provided with at least one control system for the control of the alignment of heliostat mirrors in a controlled area of the heliostat field with respect to a selected zone in the target plane, comprising:

a detection device removed from the target plane in a direction of the radiation propagation and having a detection surface facing the radiation;

first means capable of projecting on said detection surface concentrated solar radiation delivered to the selected zone from the controlled area of the heliostat field to produce thereon an image of said controlled area, said means having an optical entrance located essentially in said selected zone of the target plane;

second means associated with said detection device for measuring separately the light intensity of portions of said image and adjusting each heliostat mirror in said controlled area in response to such measurements;

third means for adjusting each heliostat mirror in said controlled area in response to such measurements.

In accordance with another aspect of the present invention there is provided, for use in a solar energy plant, a heliostat field of the specified kind.

In accordance with still another aspect of the present invention, there is provided, for use in a heliostat field, a control system of the specified kind.

The controlled area of the heliostat field may be one single mirror with either an integral reflecting surface or a reflecting surface made of facets. Alternatively, the controlled area may comprise a plurality of heliostat mirrors or even be the entire heliostat field.

The selected area of the target plane may be a central or a peripheral region of the zone of concentrated solar radiation formed by the heliostat field in the target plane, or it may be the entire area of this zone or it may rather be an area of the target plane located outside the zone of concentrated solar radiation.

Preferably, said first means are imaging means of any suitable kind such as, for example, an aperture, lens, mirror, e.g. concave mirror, prism, etc.

Preferably, said second means are capable of simultaneously measuring of the light intensity of portions of the controlled area image and comprises an array of suitable detectors such as photodiodes, a CCD camera, a scanning photodiode device or the like. Where the individual mirrors are composed of facets, high-resolution measuring means are required in order to ensure that the light spot produced by each of the facets is detected and measured.

Preferably, said third means are computerized control means providing the automatic control of the heliostat mirrors.

The fact that in accordance with the invention the concentrated radiation delivered to the target plane by the heliostat mirrors of the controlled area is analyzed in a plane removed from said target plane in a direction of the concentrated radiation enables simultaneous radiation intensity measurements of images produced by a plurality of individual heliostat mirrors and by their facets, which in turn enables a simultaneous differential control of each mirror and its facets.

Preferably, the solar energy plant comprises a solar radiation receiver mounted within a receiver chamber having a radiation inlet located essentially in the target plane of the heliostat field.

According to one embodiment of the invention, the heliostat field is provided with one single control system of the kind specified, which may be located in the central region of the radiation inlet of the receiver chamber, off-center thereof or completely outside the receiver chamber. According to another embodiment, the heliostat field is provided with a plurality of control systems at least some of which are preferably located at the periphery of the zone of concentrated solar radiation formed by the heliostat field in the radiation inlet of the receiver chamber.

Preferably, the solar energy plant comprises an additional reflector mounted on a solar tower close to the focal point of the heliostat field, which additional reflector redirects at least a portion of the concentrated solar radiation delivered by the heliostat field towards a target plane located close to the base plane in which the heliostat field is installed. In such an embodiment the control system provided in accordance with the present invention also enables detection of any dislocation of the reflector caused, for example, by tower sway. Where the additional reflector is of the beam-splitter type the target plane of the heliostat field is located substantially in the focal plane of the reflector.

In order to increase the concentration of solar radiation, the solar receiver may be provided with a secondary concentrator, preferably of a non-imaging type, which directs the solar radiation concentrated by the heliostat field from the inlet of the receiver chamber into the interior thereof.

DESCRIPTION OF THE DRAWINGS

For better understanding, the present invention will now be described, by way of example only, with reference to the accompanying drawings in which.

DETAILED DESCRIPTION OF SPECIFIC EMBODIMENTS

Figure 1:
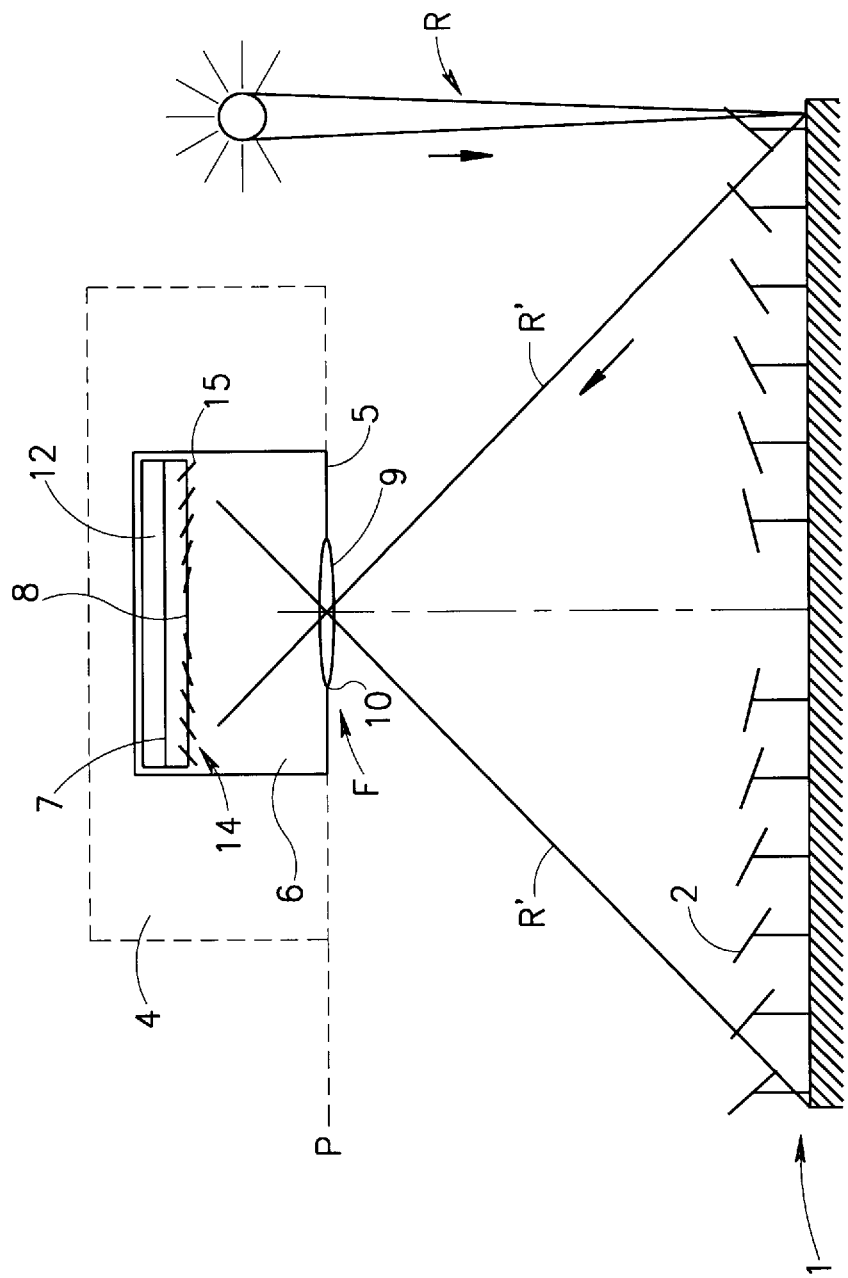
FIG. 1 is a schematic illustration of one embodiment of a solar energy plant and a control system used therein according to the present invention.
Figure 4:
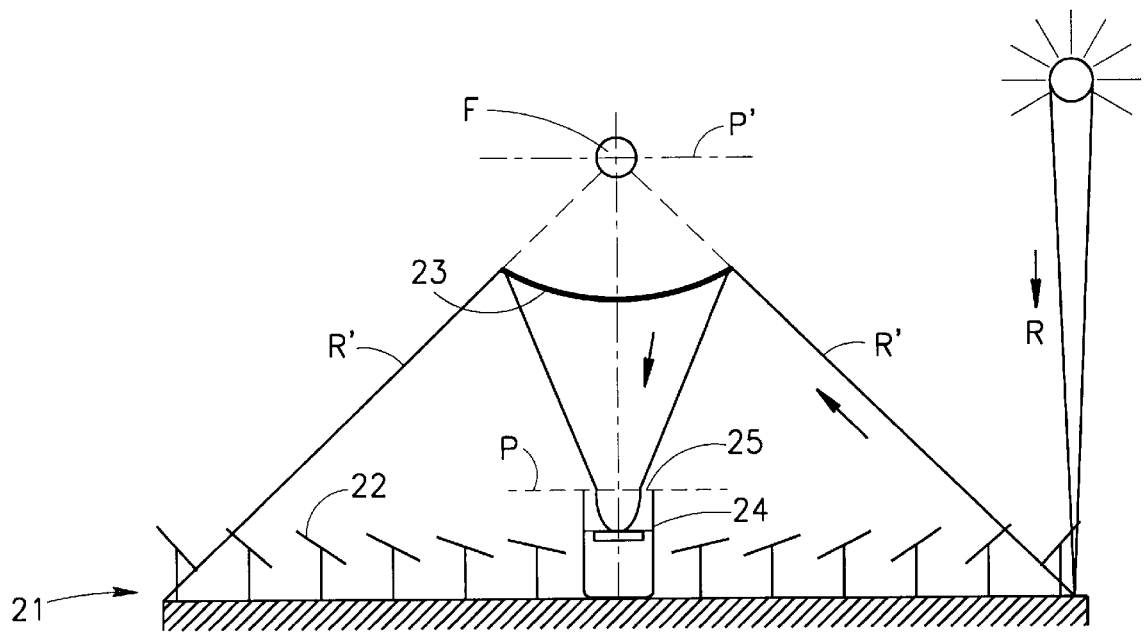
FIG. 4 is a schematic illustration of another embodiment of a plant according to the present invention.

FIGS. 1 and 4 show two alternative embodiments of a solar plant for conversion of solar radiation into utilizable energy, of the kind which comprises a heliostat field for concentration of the incoming solar radiation, a central solar receiver for absorption of the concentrated radiation and a system for control of the heliostat field according to the present invention.

The solar energy plant shown in FIG. 1 comprises a heliostats field 1 consisting of a plurality of heliostat mirrors 2 which may, for example, be in the form of parabolic mirrors and which are made of facets 3 (FIG. 3), the heliostat mirrors 2 reflecting the incoming solar radiation R towards a target plane P located close the focal point F of the heliostat field. During operation of the heliostat field 1, an angular position of each heliostat mirror is controlled by computer and adjusted automatically to track the sun. The plant further comprises a solar receiver (not shown) mounted within a receiver chamber 4 installed on top of a solar tower (not shown) in the vicinity of the focal point F of the heliostat field and having a radiation inlet 5 located essentially in the target plane P, and a control system 6 for the control of the heliostat mirrors 2, the control system 6 being mounted in the vicinity of the solar receiver.

Figure 3:
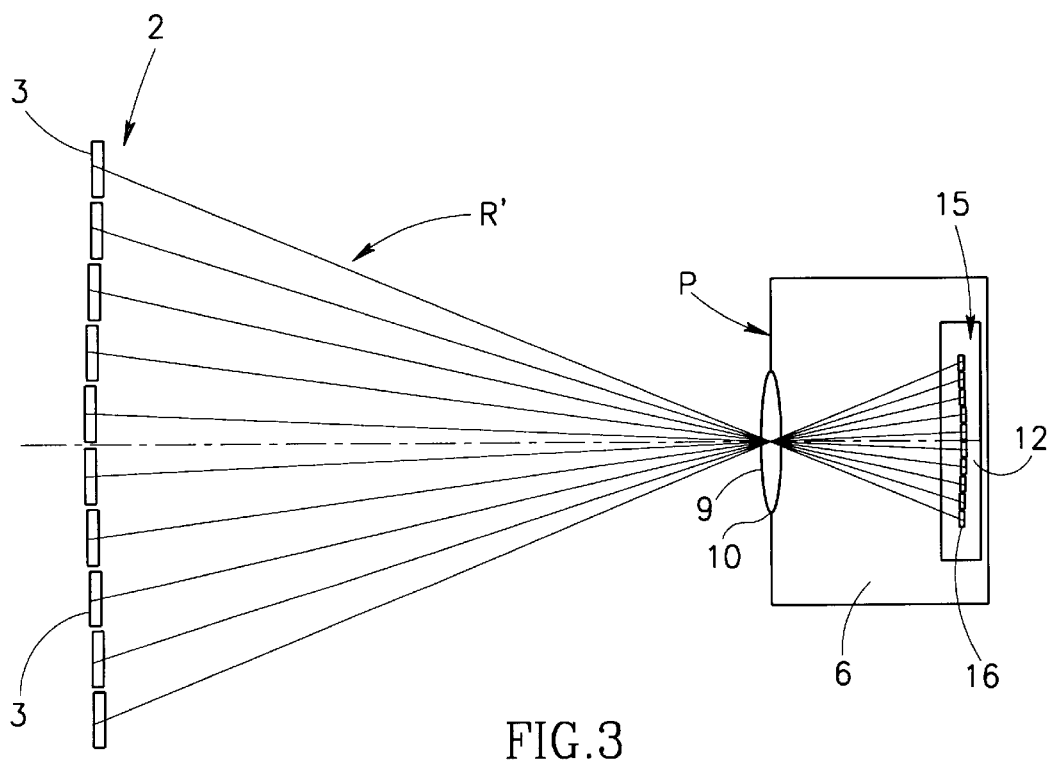
FIG. 3 is a schematic illustration of one heliostat mirror and of the control system of the plant shown in FIG. 1 drawn to a larger scale.

As seen in FIGS. 1 and 3, the control system 6 comprises a detection device 7 removed from the target plane P in the direction of the concentrated solar radiation R' and having a detection surface 8 facing the radiation and imaging means 9 capable of projecting on the detection surface 8 the radiation R' focussed on the target plane P by the heliostat field 1. The imaging means 9 have an optical entrance 10 located in the target plane P. In the present embodiment, the optical entrance 10 of the imaging means 9 is disposed in the central region of the radiation inlet 5 of the receiver chamber 4, the diameter of the optical entrance 10 being preferably substantially less, for example about 1%, of that of the radiation inlet 5. The imaging means 9 are in the form of a lens, but it may also be an aperture, a prism, a mirror or any suitable combination thereof.

The control system 6 further comprises measuring means 12 (shown schematically) associated with the detection device 7 for measuring a distribution of the light intensity in the detection surface 8 and comprising an array of suitable detectors, such as photodiodes, and preferably has a substantially high resolution. The measuring means 12 may also be a CCD-camera, a scanning photodiode or the like.

The control system 6 further comprises a computerized means (not shown) for the automatic control of each heliostat mirror 2 in response to the light intensity measurements.

Attention is now directed to FIG. 4 which shows another embodiment of the solar energy plant according to the present invention, where the control system 6 described above is used. As seen, the solar plant consists of a heliostats field 21 comprising a plurality of heliostat mirrors 22 directing concentrated radiation towards the focal point F of the heliostat field 1, a solar receiver (not shown) mounted within a receiver chamber 24 installed in the vicinity of the heliostat field 1 and having a radiation inlet 25 and an additional reflector 23 mounted on a solar tower (not shown) close to the focal point F and redirecting the concentrated radiation towards a target plane P coinciding with the surface of the radiation inlet 25 of the receiver chamber 24. The additional reflector is preferably a convex mirror. It can be of a beam-splitter type, in which case the heliostat field may have an additional target plane P' in the vicinity of the focal point F of the heliostat field 21. In order to increase the concentration of solar radiation, the solar receiver 25 is provided with a secondary concentrator 26, preferably of a non-imaging type, installed in the radiation inlet 95, which directs the solar radiation concentrated by the heliostat field 21 into the receiver cavity 24.

Figure 2:
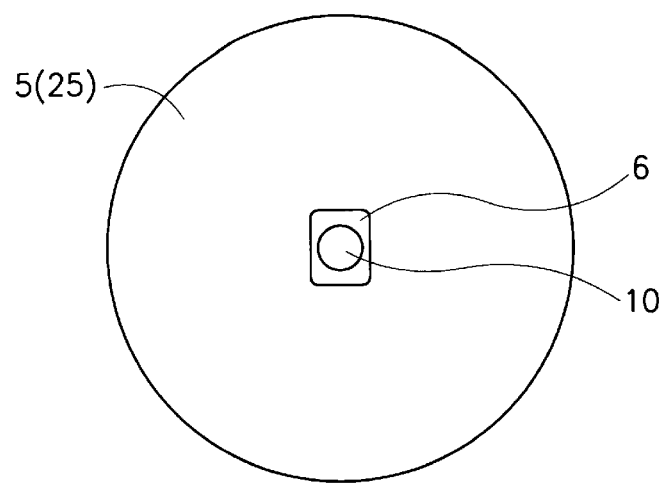
FIG. 2 is a schematic illustration of a disposition of the control system of the present invention shown in FIG. 1, with respect to the inlet of a solar receiver.

The control system 6 used in the solar plant shown in FIG. 4 is not seen in this figure but it is located in the manner illustrated by FIG. 2, i.e. so that its optical entrance 10 is disposed in the central region of the radiation inlet 25 of the receiver chamber 24.

It should be mentioned with respect the solar energy plant shown in both FIG. 1 and FIG. 4 that the control system 6 may be located also off-center of the radiation inlet 5, 25 or completely outside the receiver chamber 4, 24.

The mode of operation of the control system 6 of the solar energy plant shown in FIGS. 1 and 4 will now be described with reference to FIGS. 1 and 3. For the control of the alignment of the heliostat mirrors 2 of the heliostat field 1 with respect to the radiation inlet 5 of the receiver chamber 4, the imaging means 9 of the control system 6 project the solar radiation R' reflected from the heliostat mirrors and delivered to the optical entrance 10 of the imaging means 9 on to the detection surface 8 of the detection device 7, obtaining thereby on the detection surface 8 an image 14 of the heliostat field consisting of images 15 of the heliostat mirrors 2. As seen in FIG. 3, the image 15 of the heliostat mirror 2 comprising facets 3 consists of individual images 16 of the facets. The measuring means 12 measure separately the light intensity of images 15 and 16, if any. The intensity of radiation in the detection surface 8 is proportional to the amount of radiation delivered by the heliostat field to the optical entrance 10 of the imaging means and consequently to the radiation inlet 5 of the solar receiver 4. When the heliostat mirrors and their facets are properly aligned, the intensity of their images in the detection plane 8 has a predetermined maximal value. Intensity of the images of misaligned heliostat mirrors or facets is low.

The information provided by the light intensity measurements is used for correction of the heliostats' tracking strategy controlled by computer means and for adjustment of the heliostat facets. The orientation of misaligned heliostat mirrors and/or their facets is automatically changed to establish a better or an optimal position thereof. Thus, the fact that the intensity of radiation reflected by individual heliostat mirrors and facets thereof is measured separately and independently, enables a simultaneous differential control of the heliostat mirrors and their facets.

Figure 5:
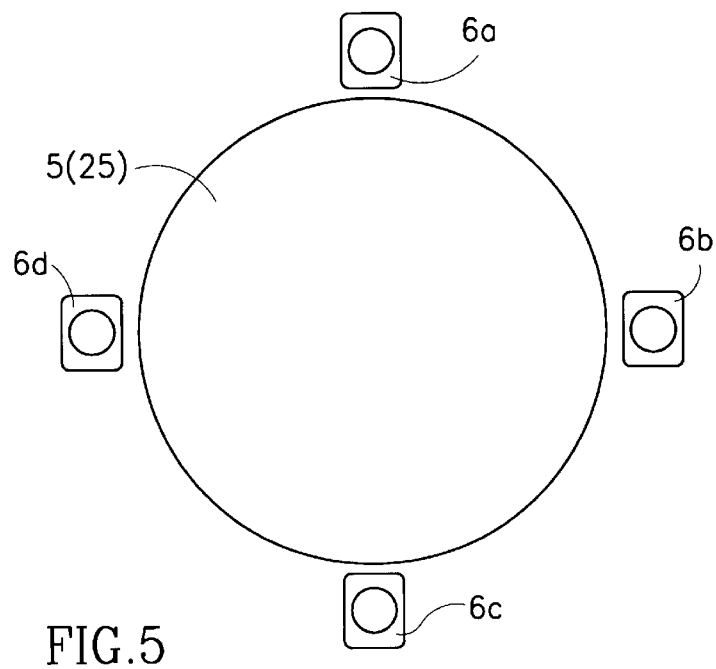
FIG. 5 is a schematic illustration of a disposition of a plurality of control systems of the present invention, with respect to the inlet of a solar receiver.

As shown in FIG. 5, the solar energy plant according to the present invention may comprise a plurality of control systems 6a, 6b, 6c and 6d located at the periphery of the radiation inlet 5, 25 of the receiver chamber 4, 2.

Figure 6:
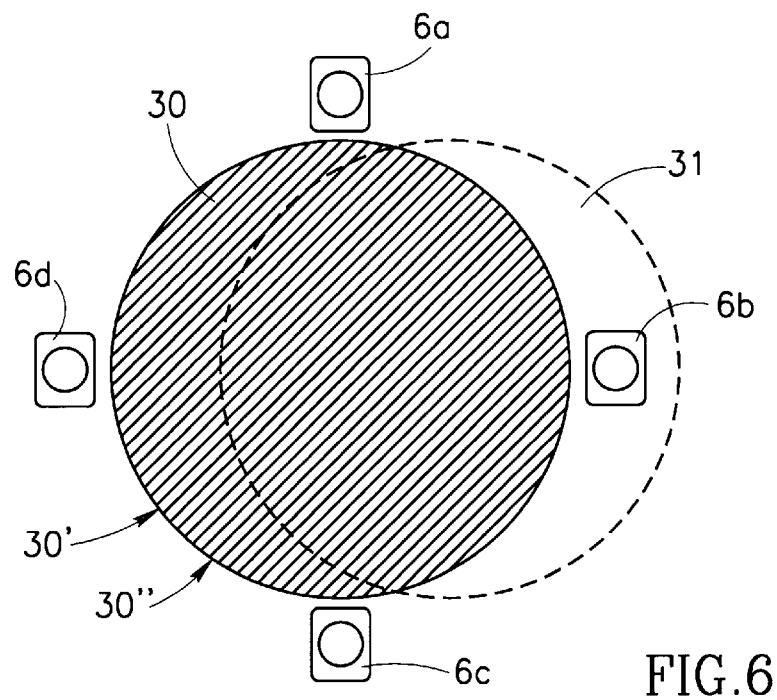
FIG. 6 illustrates a light spot produced in the target plane by three heliostat mirrors of which on is misaligned.
Figure 7:
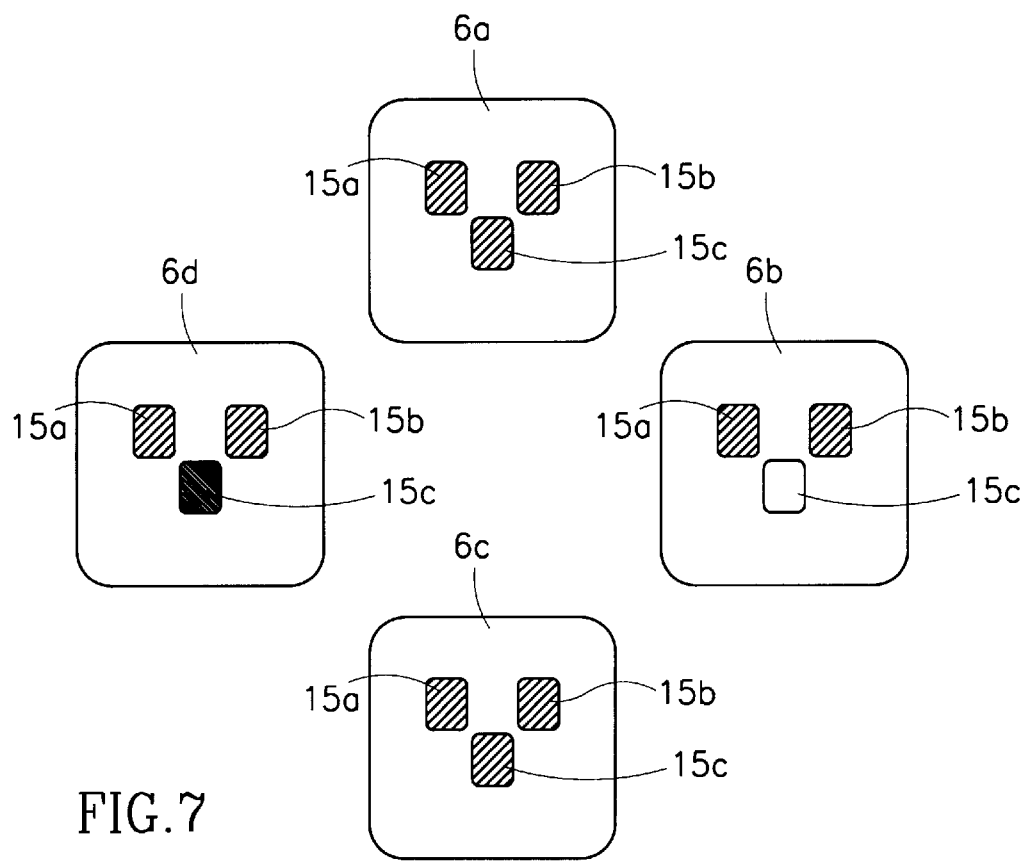
FIG. 7 illustrates the light intensity of images of the three heliostat mirrors of which one is misaligned, measured by the control systems disposed as shown in FIG. 5.

The mode of operation of the control systems 6a to 6d is illustrated by FIGS. 6 and 7. FIG. 6 shows a radiation spot 30 produced in the radiation inlet 5, 25 by heliostat mirrors A, B and C of the heliostat field of the solar plant. As seen, the mirrors A and B are aligned properly so that their spots 30' and 30" overlap and the mirror C is misaligned so that only a portion of its spot 31 overlaps with the spots 30' and 30". FIG. 7 illustrates light intensity of images 15a, 15b and 15c of the three heliostat mirrors A, B and C produced by the imaging device of each of the control systems 6a, 6b, 6c and 6d on the detection surface of its detection device. The control of the heliostat mirrors A, B and C is based on the comparison of the light intensity of the images 15a, 15b and 15c of the heliostat mirrors formed at the detection surface of the control systems 6a to 6d. The information provided by the control systems is used to calculate the required coordinates of the heliostat mirror C and to accordingly adjust its position.

Thus, the present invention enables an automatic control of the heliostat mirrors during their operation so that misaligned heliostats continue radiation collection being simultaneously adjusted. With the control of heliostat field according to the present invention, displacements of the target plane P or of the additional reflector 23 (FIG. 4), caused for example by a tower sway, can also be corrected.

The control system according to the present invention may also be used to control the reflectivity of heliostat mirrors and facets. It has to be mentioned that the solar energy plant and the control system designed according to the present invention may have features different from those described above and shown in the accompanying drawings. Thus, for example, the control system may be installed outside the central solar receiver, the concentrated radiation being reflected or delivered thereto by any suitable means, e.g. by a beam splitter. The control system may comprise means for manual adjusting each heliostat mirror on the basis of the light intensity measurements.

We claim:

1. A solar energy plant comprising a heliostats field with a plurality of heliostat mirrors for the concentration of solar radiation and direction of the concentrated solar radiation towards a target plane, and at least one control system for the control of the alignment of heliostat mirrors in a controlled area of the heliostat field with respect to a selected zone in the target plane, said control system comprising a detection device associated with said target plane and having a detection surface, and adjusting means for adjusting the heliostat mirrors in said controlled area based on measurements made on the detection surface of the detection device;

characterised in that said detection device of the control system is removed from the target plane in the direction of the concentrated solar radiation, said detection surface facing said concentrated radiation, said control system further comprising first means having an optical entrance located essentially in said selected zone of the target plane and capable of projecting on said detection surface the concentrated solar radiation delivered to the selected zone from the controlled area of the heliostat field to produce thereon an image of said controlled area, and second means associated with said detection device for measuring separately the light intensity of portions of said image of the controlled area.

2. A solar energy plant according to claim 1, wherein the controlled area of the heliostat field is one single mirror.

3. A solar energy plant according to claim 1, wherein the controlled area of the heliostat field comprises a plurality of heliostat mirrors.

4. A solar energy plant according to claim 1, wherein the selected area of the target plane is a central region of the zone of concentrated solar radiation formed by the heliostat field in the target plane.

5. A solar energy plant according to claim 1, wherein the selected area of the target plane is a peripheral region of the zone of concentrated solar radiation formed by the heliostat field in the target plane.

6. A solar energy plant according to claim 1, wherein the selected area of the target plane is located outside the zone of concentrated solar radiation.

7. A solar energy plant according to claim 1, wherein said first means comprise an aperture.

8. A solar energy plant according to claim 1, wherein said first means comprise a lens.

9. A solar energy plant according to claim 1, wherein said first means comprise a concave mirror.

10. A solar energy plant according to claim 1, wherein said first means comprise a prism.

11. A solar energy plant according to claim 1, wherein said second means are capable of simultaneously measuring of the light intensity of portions of the controlled area image.

12. A solar energy plant according to claim 1, wherein said third means are computerized control means providing the automatic control of the heliostat mirrors.

13. A solar energy plant according to claim 1, comprising a solar radiation receiver mounted within a receiver chamber having a radiation inlet located essentially in the target plane of the heliostat field.

14. A solar energy plant according to claims 13, wherein said at least one control system is located in the central region of the radiation inlet of the receiver chamber.

15. A solar energy plant according to claim 13, wherein said at least one control system is located eccentrically with respect to the radiation inlet of the receiver chamber.

16. A solar energy plant according to claim 13, wherein said at least one control system is located outside the receiver chamber.

17. A solar energy plant according to claim 1, comprising one single control system.

18. A solar energy plant according to claim 1, comprising a plurality of control systems.

19. A solar energy plant according to claim 18, wherein at least some of said control systems are located at the periphery of the zone of concentrated solar radiation formed by the heliostat field in the radiation inlet of the receiver chamber.

20. A solar energy plant according to claim 18, wherein the control of the heliostat mirrors is based on the comparison of the light intensity of the images of the heliostat mirrors formed at the detection surface of said control systems.

21. A solar energy plant according to claim 1, wherein said target plane is the focal plane of the heliostat field.

22. A solar energy plant according to claim 1, comprising an additional reflector mounted on a solar tower close to the focal point of the heliostat field, which additional reflector redirects at least a portion of the concentrated solar radiation delivered by the heliostat field towards a target plane located close to the base plane in which the heliostat field is installed.

23. A solar energy plant according to claim 22, wherein said additional reflector is of a beam-splitter type.

24. A solar energy plant according to claim 23, wherein the heliostat field has an additional target plane located in the focal plane thereof.

25. A solar energy plant according to claim 13, wherein the solar receiver comprises a secondary concentrator which directs the solar radiation concentrated by the heliostat field from the inlet of the receiver chamber into the interior thereof.

26. For use in a solar energy plant, a heliostat field having a plurality of heliostat mirrors for the concentration of solar radiation and direction of the concentrated solar radiation towards a target plane and having at least one control system for the control of the alignment of heliostat mirrors in a controlled area of the heliostat field with respect to a selected zone in the target plane, said control system comprising a detection device associated with said target plane and having a detection surface, and adjusting means for adjusting the heliostat mirrors in said controlled area based on measurements made on the detection surface of the detection device;

characterised in that said detection device of the control system is removed from the target plane in the direction of the concentrated solar radiation, said detection surface facing said concentrated radiation, said control system further comprising first means having an optical entrance located essentially in said selected zone of the target plane and capable of projecting on said detection surface the concentrated solar radiation delivered to the selected zone from the controlled area of the heliostat field to produce thereon an image of said controlled area, and second means associated with said detection device for measuring separately the light intensity of portions of said image of the controlled area.

27. For use with a heliostat field having a plurality of heliostat mirrors for the concentration of solar radiation and direction of the concentrated solar radiation towards a target plane, a system for control of the alignment of heliostat mirrors in a controlled area of the heliostat field with respect to a selected zone in the target plane, said system comprising a detection device associated with said target plane and having a detection surface, and adjusting means for adjusting the heliostat mirrors in said controlled area based on measurements made on the detection surface of the detection device;

characterised in that said detection device of the control system is removed from the target plane in the direction of the concentrated solar radiation, said detection surface facing said concentrated radiation, said control system further comprising first means having an optical entrance located essentially in said selected zone of the target plane and capable of projecting on said detection surface the concentrated solar radiation delivered to the selected zone from the controlled area of the heliostat field to produce thereon an image of said controlled area, and second means associated with said detection device for measuring separately the light intensity of portions of said image of the controlled area.

* * * * *